Figure 1:
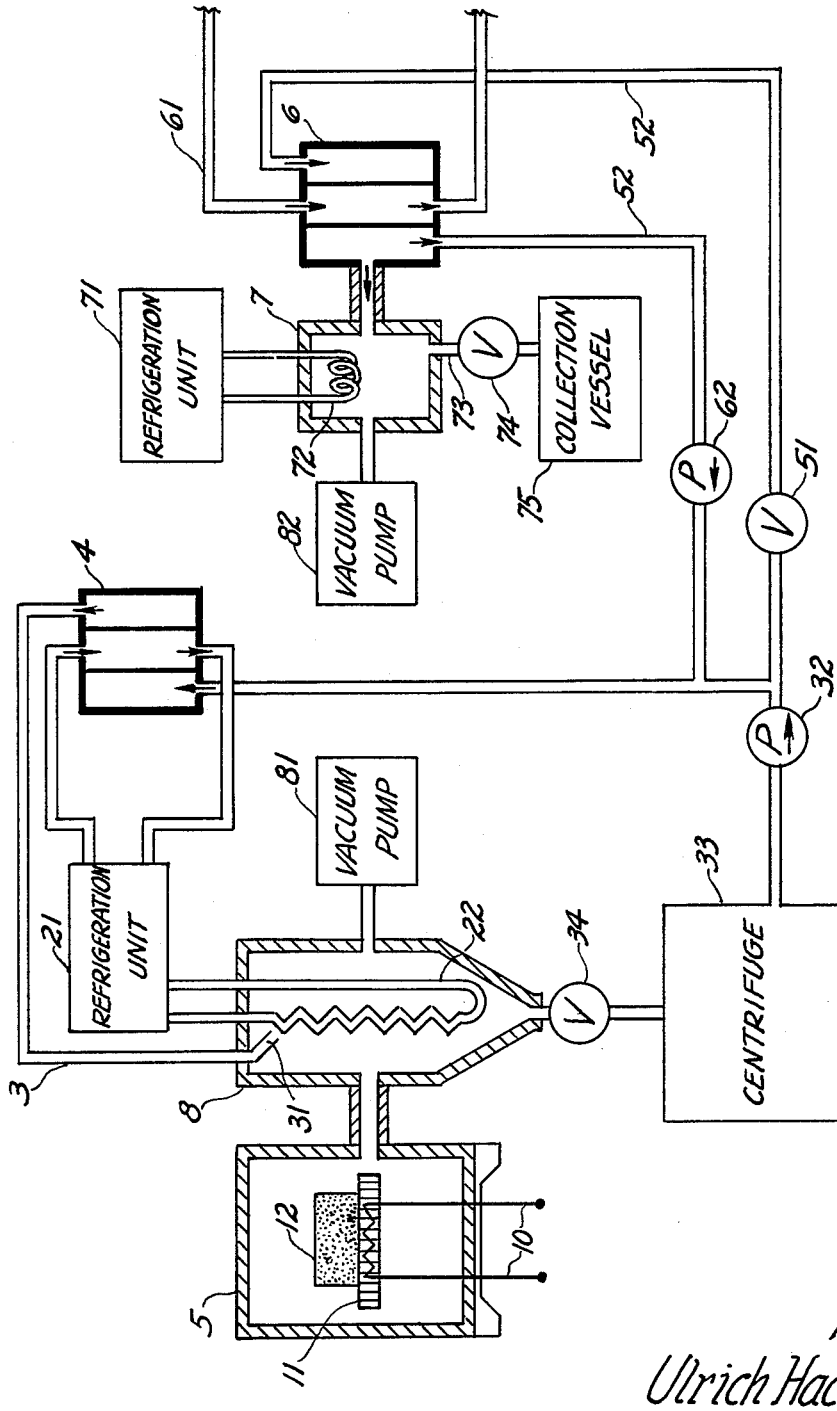

INVENTOR:
Ulrich Hackenberg
BY John E. Toupal
ATTORNEY.

March 8, 1966 U. HACKENBERG 3,238,633
METHOD AND APPARATUS FOR RECLAIMING AROMATIC SUBSTANCES IN
DRYING PROCESS
Filed June 10, 1963 2 Sheets-Sheet 2

INVENTOR:
Ulrich Hackenberg
BY John E. Toupal
ATTORNEY.

United States Patent Office
3,238,633
Patented Mar. 8, 1966

3,238,633
METHOD AND APPARATUS FOR RECLAIMING AROMATIC SUBSTANCES IN DRYING PROCESS
Ulrich Hackenberg, Alter Trassweg 9, Bensberg, Germany
Filed June 10, 1963, Ser. No. 286,545
10 Claims. (Cl. 34—5)

This invention relates to a method and apparatus for reclaiming gaseous aromatic materials liberated in vacuum-drying processes and especially in vacuum freeze-drying processes.

Conventional food drying processes effect evaporation and removal of the moisture such as water or organic solvents, in a material to be dried. Frequently, not only the unwanted moisture is removed but to a greater or lesser degree other evaporable materials are also removed. Often the loss of these other materials is extremely undesirable, as for example, when the lost materials contributed to the taste and smell of the original food.

For this reason processes have been developed to reclaim the lost aromatic materials by separating them from the water or solvent materials coming out of the drying product. However, such processes have in general been unsatisfactory and in freeze-drying processes have been particularly unsuccessful.

It is, therefore, the object of this invention to provide a method and apparatus for reclaiming aromatic materials inadvertently liberated in conventional product-drying processes.

The method and apparatus according to the subject invention procides for fractionation of vaporous material to a much higher degree than in well-known processes. This improvement is obtained by not only selective condensation of the vaporous materials but also by appropriate binding to other media. This is accomplished by binding the mixture of vaporous materials and water vapor to at least one cooled liquid by condensation, absorption, adsorption, and/or chemical reaction. The desired material is then reclaimed from the substance formed by separating the moisture (especially water) therefrom in the form of ice.

The separation of moisture from desired vaporous materials according to the invention can be a purely physical separation effected by means of condensation. However, it is preferable that the separation occur as a result of a binding of the aromatic materials which is effected by adsorption, absorption, or chemical reaction. The condensation of the water vapor and the binding of the vaporous aromatic materials can occur by contact with the same cooled collecting medium. It may be preferable in other applications that binding of individual vaporous materials occur sequentially in a plurality of physically separated collecting media. Such a separation is of economic importance because of the substantially different condensation temperatures required for the individual materials. For example, water vapor which forms an extremely large part of the vaporous mixture can be condensed at a relatively high temperature. Therefore the large condensers used for water vapor can be operated at relatively low temperature and with correspondingly low energy inputs. Conversely, the costly high energy super-cooled condensers used for the aromatic materials can be of smaller capacity, since the quantity of these materials in the mixture is limited.

Figure 2:
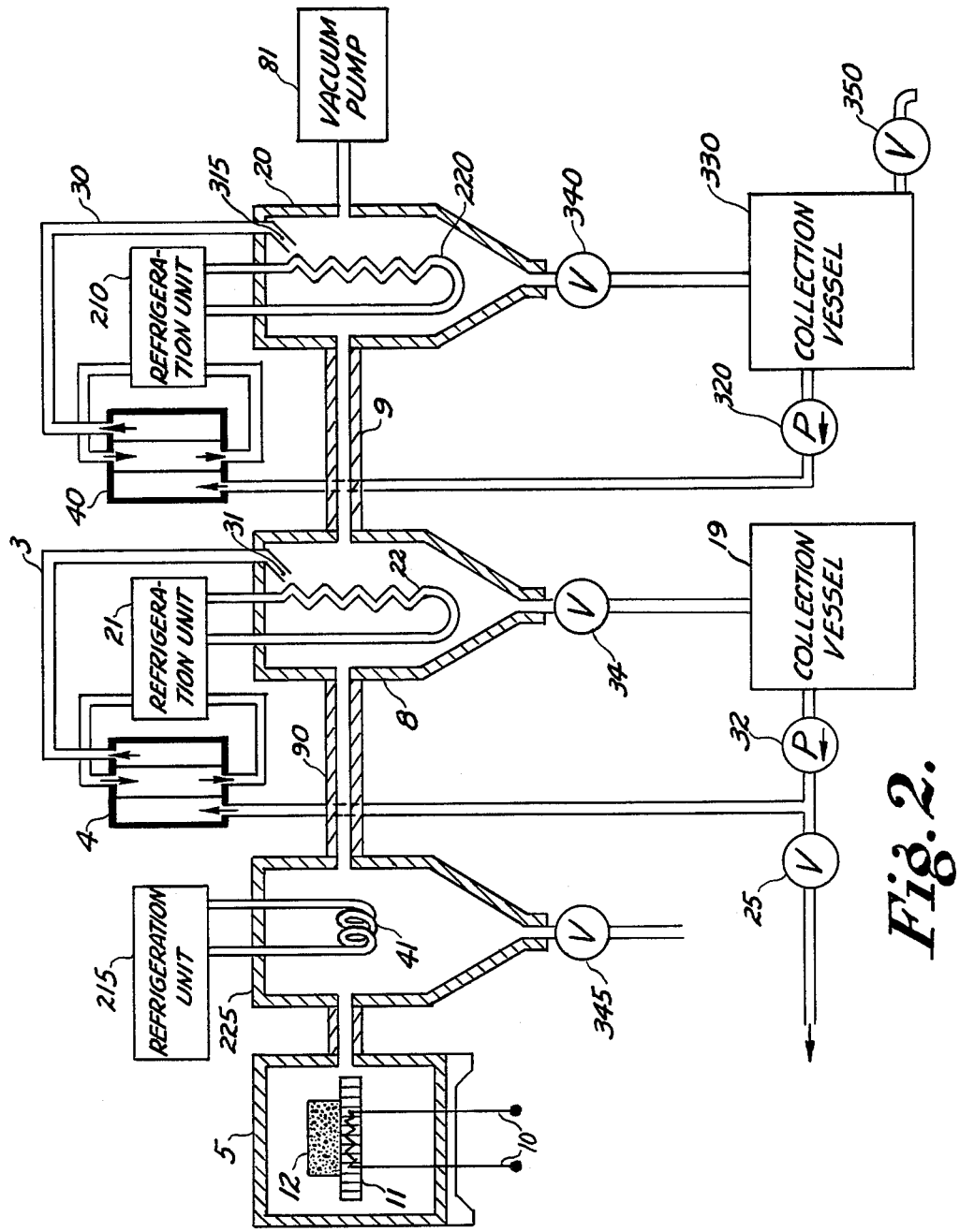

Many other features and advantages of the subject invention will become apparent upon a perusal of the following specification considered in conjunction with the accompanying drawings wherein:

FIGURE 1 is a schematic showing of a single-stage reclaiming apparatus according to the present invention; and FIGURE 2 is a schematic showing of a multi-stage reclaiming apparatus according to the invention.

Referring now to FIGURE 1 there is shown the freeze-drying chamber 5 containing the support surface 11 adapted to be electrically heated by electrical leads 10. On the support surface 11 is placed a material 12 to be freeze dried. The drying chamber 5 is connected for gas communication with a condenser 8, enclosing a heat exchanger tube 22 which is deep cooled by a refrigeration unit 21. Terminating within the condenser 8 is the open end 31 of a tubulation 3 for supplying a primary liquid collecting medium which can be, for example, silicone oil. The tubulation 3 is arranged within the condenser 8 in such a manner that the collecting medium supplied thereto flows down along the surface of the heat exchanger tube 22.

The tubulation 3 passes through a collecting medium heat exchanger 4 and a fluid pump 32 before terminating in a receiving vessel 33 connected through a shut-off valve 34 to the bottom of the condenser 8. The receiving vessel 33 is preferably built as a centrifuge in which ice formed in the condenser 8 from the water vapor coming from the material 12 is separated from the collecting liquid and bound aromatic gases. The heat exchanger 4 is also cooled by the refrigeration unit 21 and a vacuum pump 81 produces evacuation of the condenser 8 and the drying chamber 5.

Connected to the tubulation 3 between the fluid pump 32 and heat exchanger 4 are the ends of a reclaiming tubulation 52. The reclaiming tubulation 52 passes through a shut-off valve 51, an evaporation producing heat exchanger 6 and another fluid pump 62. The evaporation inducing heat exchanger 6 is fed by tubulation 61 connected to a suitable source of heating fluid (not shown). The portion of the heat exchanger 6 connected to the reclaiming tubulation 52 is also connected for gas communication with a reclaiming condenser 7 housing a heat exchanger 72. The refrigeration unit 71 supplies the heat exchanger 72 and the vacuum pump 82 produces evacuation of the condenser 7 and evaporation inducing heat exchanger 6. A tube 73 connects the collection vessel 75 to the bottom of the condencer 7 through a shut-off valve 74.

In the operation of the apparatus shown in FIGURE 1, the drying chamber 5 and condenser 8 are evacuated to a suitable pressure by the vacuum pump 81 and the well-known freeze-drying process begun on the frozen product 12. With shut-off valve 51 closed, a collecting medium (for example, silicone oil) is circulated from the filled vessel 33 into the condenser 8 by the fluid pump 32. The vaporous mixture sublimating out of the frozen product 12 is pumped into the condenser 8 where it adheres to the liquid collecting medium flowing along the heat exchanger tube 22. The temperature of the liquid medium is reduced by the heat exchangers 4 and 22 to such an extent as to produce freezing of the water vapor in the vaporous mixture while the bound aromatic materials and the collecting medium remain in the liquid state.

Having been separated from the water-formed ice in the centrifuge vessel 33, the liquid collecting medium and bound aromatic material are circulated to the evaporation inducing heat exchanger 6 through the now open valve 51. The heat exchanger 6 is maintained at a temperature sufficient to evaporate the aromatic material from the liquid collecting medium which is then either again circulated through the condenser 8 for further process operations or returned to the centrifuge collection vessel 33 for future use. The evaporated aromatic vapor is pumped into condenser 7 and condensed on the super-cooled heat exchanger 72. The aromatic condensate thus formed is then thawed and collected in the vessel 75 and can later be used in the reconstitution of freeze-dried product 12.

Referring now to FIGURE 2, there is shown a multi-stage reclaiming apparatus in which components performing the same function as those in FIGURE 1 are given identical reference numerals. Connected between the freeze-dry chamber 5 and the condenser 8 by a tubulation 90 is a water vapor condenser 225 containing the heat exchanger coil 41 cooled by a refrigeration unit 215. A third condenser 20 and associated vacuum pump 81 are connected to the opposite side of the condenser 8 by a tubulation 9.

The third condenser 20 encloses the heat exchange tube 220 cooled by the refrigeration unit 210 and the open end 315 of a collection medium circulation tube 30. The circulation tube 30 passes through a heat exchanger 40, which is also cooled by the refrigeration unit 210, and a fluid pump 320 to terminate in the collection vessel 330.

The operation of this embodiment is similar to that described by the embodiment shown in FIGURE 1. However, in this embodiment the heat exchanger coil 41 is cooled to a temperature slow enough to produce freezing of the water vapor sublimating from the frozen material 12 but high enough to prevent condensation of the vaporous aromatic materials coming therefrom. The water vapor formed ice subsequently is thawed and removed via valve 345. The non-condensed vaporous aromatic materials are pumped into the condenser 8 and reclaimed by the primary collecting medium in the same manner as described in connection with FIGURE 1. Here, however, centrifuge separation of the bound aromatic material and liquid collecting medium from ice is not required since the water-formed ice has already been removed in the water vapor condenser 225. The bound aromatic material and liquid collecting medium can be removed from the collection vessel 19 through the valve 25 for evaporative separation or other processing as described above.

Aromatic materials, such as vaporous acids, which have lower condensation temperatures and which are not bound to the collecting medium in the condenser 8 are pumped into the third condenser 20. A supplementary collecting medium, such as an alkaline solution, is circulated by the fluid pump 320 from the filled vessel 330 through the heat exchanger 40 and into the third condenser 20. Here it flows out of the opening 315 and down the surface of heat exchanger tube 220. The saponification occurring upon contact between the cooled supplementary collecting medium and the aromatic acids produces esters which are deposited into the collection chamber 330 via valve 340. This reaction product can then be removed via valve 350 for processing and use later to reconstitute the dried product 12.

The mention of silicone oil as a collection medium represents merely an example and does not exclude the use of other suitable media. Further substances that are suitable for collection include other types of oil or organic solvents which must be cooled to prevent vaporization in the reduced pressure of a vacuum freeze-drying process. Cooling of this type media would of course be required to insure that it remained in the liquid state during the process. However, even when utilizing relatively low vapor pressure collection materials (for example, silicone oil) which remain in the liquid state under the reduced pressure of the freeze-drying process there are substantial reasons for using them in the cooled state. The cooling renders the collection liquid more effective by increasing its affinity for aromatic materials.

Many obvious modifications in the above description will be obvious. For example, the cooled collection media can be independently used in the condensers without the requirement for separate heat exchange tubes 22 and 220. Also, it is possible to work with several possibly different deep-cooled collecting media in which the various components of the aromatic materials are received according to their particular affinity. This affinity can result from physical solubility or can be due to chemical reaction.

The collecting liquid can also fulfill its function if it is the vehicle or transport medium for ion exchange materials. The affinity can be further due to adsorption phenomena as when, for example, the circulating liquid contains adsorbents such as activated charcoal.

It is, therefore, to be understood that within the scope of the appended claims the invention may be practiced otherwise than as specifically described.

What is claimed is:

1. An apparatus for reclaiming vaporous aromatic materials liberated with moisture in vacuum freeze-drying processes comprising a vacuum chamber adapted to contain a frozen material to be dried, vacuum pumping means adapted to evacuate said vacuum chamber, heating means adapted to produce sublimation of substantially all the frozen moisture contained in the material to be dried, circulating means for circulating a liquid collecting medium into contact with the sublimating vapor so as to bind the vaporous aromatic materials contained therein, and reclaiming means for separating the sublimated aromatic vapors both from the water vapor produced during the drying process and from the liquid collecting medium.

2. The apparatus according to claim 1 wherein said circulating means is adapted to circulate a liquid collecting medium and including means for cooling the circulating collecting medium.

3. The apparatus according to claim 1 wherein said reclaiming means includes an evaporator means adapted to produce evaporation of the aromatic material from the liquid collecting medium, and refrigerated condenser means adapted to condense the sublimated water vapor.

4. The apparatus according to claim 1 wherein said reclaiming means includes a refrigerated condenser adapted to freeze the water vapor sublimated in the freeze drying process and means for separating the frozen water vapor from the bound vaporous aromatic material and liquid collecting medium.

5. A method for reclaiming vaporous aromatic materials liberated with moisture in vacuum freeze-drying processes comprising the steps of heating under vacuum a frozen matetrial to be dried so as to cause sublimation of substantially all the frozen moisture contained therein, directing a primary liquid collection medium into contact with so as to bind the sublimating vaporous aromatic materials thus produced, separating the sublimated water vapor from the sublimated vaporous aromatic material, and separating the aromatic materials from the liquid collection medium.

6. The method according to claim 5 wherein said step of separating the sublimated water vapor from the sublimated vaporous aromatic material includes the steps of freezing the water vapor and separating the frozen water vapor from the sublimated vaporous aromatic material.

7. The method according to claim 6 wherein the primary collecting medium is a liquid medium having a freezing point below 32° F. and including the step of cooling the collection medium before contact with the sublimated vaporous aromatic material.

8. The method according to claim 7 wherein said step of separating the aromatic materials from the collection medium includes the step of heating the bonded aromatic material and collection medium to produce evaporation of said aromatic material.

9. The apparatus according to claim 8 wherein said circulating means is adapted to circulate the liquid collecting medium onto the surface of said refrigerated condenser.

10. The method according to claim 5 including the step of directing a different supplementary collecting medium into contact so as to produce a bond with sublimated vaporous aromatic materials not bound by said primary liquid collection medium and separating the thus bound aromatic materials from said different supplementary collecting medium.

References Cited by the Examiner
UNITED STATES PATENTS

| | | | |
|---|---|---|---|
| 2,249,624 | 7/1941 | Bichowsky | 34—77 |
| 2,436,693 | 2/1948 | Hickman | 34—5 |
| 2,507,632 | 5/1950 | Hickman | 34—5 |
| 2,513,813 | 7/1950 | Milleville | 99—205 |
| 2,625,505 | 1/1953 | Cross | 202—52 |
| 2,666,707 | 1/1954 | Beu | 202—52 |

WILLIAM J. WYE, *Primary Examiner.*

NORMAN YUDKOFF, *Examiner.*